(12) United States Patent
Dörfler et al.

(10) Patent No.: US 11,773,877 B2
(45) Date of Patent: Oct. 3, 2023

(54) CONNECTING ELEMENT AND SUPPLY BLOCK FOR A VALVE ARRAY

(71) Applicant: Alfmeier Präzision SE, Treuchtlingen (DE)

(72) Inventors: Erich Dörfler, Treuchtlingen (DE); Ronny Gehlmann, Treuchtlingen (DE); Matthias Mitzler, Treuchtlingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 17/166,283

(22) Filed: Feb. 3, 2021

(65) Prior Publication Data
US 2021/0246916 A1    Aug. 12, 2021

(30) Foreign Application Priority Data
Feb. 6, 2020  (DE) ...................... 10 2020 201 428.0

(51) Int. Cl.
*F15B 13/08* (2006.01)
*B60N 2/90* (2018.01)

(52) U.S. Cl.
CPC .......... *F15B 13/0842* (2013.01); *B60N 2/914* (2018.02); *F15B 13/0871* (2013.01)

(58) Field of Classification Search
CPC .............. F15B 13/0842; F15B 13/0814; F15B 13/0871; F15B 2013/002–006;
(Continued)

(56) References Cited

U.S. PATENT DOCUMENTS

| 3,470,893 | A | | 10/1969 | Nelson | |
|---|---|---|---|---|---|
| 4,507,707 | A | * | 3/1985 | Willis | F15B 13/0835 361/679.01 |
| 4,626,005 | A | * | 12/1986 | Stifter | E04H 4/065 285/239 |

(Continued)

FOREIGN PATENT DOCUMENTS

| CN | 102161321 A | 8/2011 |
|---|---|---|
| CN | 108869811 A | 11/2018 |

(Continued)

OTHER PUBLICATIONS

German Search Report for Application No. 10 2020 201 428.0, dated Dec. 12, 2020 with English Translation
(Continued)

*Primary Examiner* — Michael R Reid
(74) *Attorney, Agent, or Firm* — JK Intellectual Property Law, PA (57) ABSTRACT

A connecting element for connecting ports of a valve array's valve attachment block to a supply block may include first engagement elements on one side for establishing a connection to the ports, and second engagement elements on another side for establishing a connection to the supply block. The first and second engagement elements may be configured to establish gas-tight connections, wherein the connecting element includes a flexible material. In a further combination, the supply block has an attachment side for attaching tubes to the supply block and a connection side for connecting the supply block to the connecting element, the connection side having engagement elements which are engageable with the second engagement elements of the connecting element for establishing a gas-tight connection. The supply block may be less flexible than the connecting element. A further combination may include the valve array.

4 Claims, 3 Drawing Sheets

(58) Field of Classification Search
CPC ........... F15B 2211/40576; B60N 2/914; Y10T 403/7129; Y10T 403/7135; Y10T 403/7141; Y10T 403/25; Y10T 403/63; Y10T 403/635
See application file for complete search history.

(56) References Cited

U.S. PATENT DOCUMENTS

| | | | |
|---|---|---|---|
| 4,950,255 A * | 8/1990 | Brown | A61M 39/284 604/533 |
| 6,820,634 B2 | 11/2004 | Reichert et al. | |
| 7,311,882 B1 * | 12/2007 | Renzi | B01L 3/565 422/546 |
| 8,033,297 B2 * | 10/2011 | Okamoto | F15B 13/0857 137/884 |
| 8,092,409 B2 * | 1/2012 | Mros | F16L 39/02 601/151 |
| 8,794,707 B2 | 8/2014 | Bocsanyi et al. | |
| 8,801,046 B2 * | 8/2014 | Shinoda | F16L 39/00 285/124.1 |
| 10,688,842 B2 | 6/2020 | Repela et al. | |
| 2003/0193187 A1 * | 10/2003 | Takada | F16L 37/144 285/120.1 |
| 2018/0080282 A1 | 3/2018 | Pogatschnigg et al. | |
| 2019/0049026 A1 | 2/2019 | Beuschel et al. | |

FOREIGN PATENT DOCUMENTS

| | | |
|---|---|---|
| DE | 69 08 499 U | 12/1970 |
| EP | 2 063 131 A1 | 5/2009 |

OTHER PUBLICATIONS

Chinese Office Action dated Oct. 10, 2022, for Chinese Application No. 202110164188.3 with English translation.

* cited by examiner

CONNECTING ELEMENT AND SUPPLY BLOCK FOR A VALVE ARRAY

CROSS-REFERENCE TO RELATED APPLICATIONS

This application claims benefit to German Patent Application Number 10 2020 201 428.0, dated Feb. 6, 2020, which is incorporated in its entirety by reference herein.

TECHNICAL FIELD

The present disclosure generally relates to a connecting element for connecting a valve attachment line of a valve array to a supply block for supplying the valve array with air, as well as to a supply block for connecting tubes via a connecting element, as well as to a combination of a connecting element and a supply block, and a combination of a valve array and a connecting element as well as a supply block.

BACKGROUND

It is now known in the automotive industry to equip the seats of vehicles with separately adjustable air cushions. Seats are now also known that have a massage function and/or can be configured as a lumbar support.

The necessary bladders or air cushions are there arranged distributed across the vehicle seat. In order for the air cushions or bladders to be able to be controlled individually and filled separately with or emptied of air, valve assemblies are known which are arranged outside the air cushions/bladders and include several individually controllable valves which supply air to the air cushions independently that are respectively connected thereto or drain air from them, whereby the function of a lumbar support or a massage function can be realized.

Separate ports to an air supply are also to be provided in order to be able to implement the separate actuation of the individual air cushions.

For this purpose, U.S. Pat. No. 6,820,634 B2 proposes an attachment block, on one side of which the tubes can be attached and which with its other side is fastened to the actual valve housing. This creates the possibility of creating, firstly, a holder for the tubes and, secondly, a reliable connection to the valve array or the valve inlets of the valve attachment block, with which manufacturing tolerances between, firstly, the valve inlets and, secondly, the tubes can be compensated for. However, the assembly of such plug connectors poses problems for the worker, since the plug connector can only be fastened to the housing of the valve array in one orientation, which is problematic and unwieldy, in particular when the valve array is installed or preassembled.

SUMMARY

An objective of the present disclosure is to specify a connecting element as well as a supply block with which a connection between the valve inlets of a valve array and the tubes, which is simplified in terms of assembly but nevertheless reliable, can be established.

This objective and/or others may be satisfied at least in part by the disclosed connecting element, the supply block, a combination of a connecting element and a supply block, or a combination of a valve array, a connecting element, and a supply block. Advantageous developments of the disclosure are included in the dependent claims.

The connecting element according to the disclosure for connecting a valve attachment block of a valve array to a supply block, for example, for supplying the valve array with air or for supplying air cushions with air by way of the valve array, includes on one side first engagement elements for establishing a connection to ports of the valve attachment block and on the other side second engagement elements for establishing a connection to the supply block, wherein the first and the second engagement elements are configured to establish a gas-tight connection to the valve attachment block and to the supply block, wherein the connecting element is made of a flexible material or includes a flexible material.

The connecting element made of or comprising a flexible material is to be understood according to the disclosure to mean that preferably at least a portion of the second engagement elements includes or is made of such a flexible material, so that the shape and/or alignment of the second engagement elements can be changed at least slightly by the action of force without damage and without a permanent change in shape.

In addition, the first engagement elements and/or the entire connecting element can also be made of or include a flexible material.

This connecting element ensures a connection of the connecting element to the valve attachment block, which is simplified for the user but nevertheless reliable, and there in particular of the ports of the valve attachment block on the one hand and the subsequent connection of the combination of the connecting element and the valve attachment block to a supply block. This allows for pre-assembly of the valve array (with connecting element) and establishing a subsequent connection to the supply block.

It can be provided that the flexible material includes one of rubber, an elastomer and/or polyurethane. These materials provide sufficient flexibility, but at the same time good sealing properties, so that assembly is simplified, wherein the gas-tight connection between the individual elements can be reliably established.

Furthermore, the second engagement elements can include a receiving region that is conical at least in part in the direction of the first engagement elements for receiving engagement elements of the supply block. The first engagement elements and the second engagement elements are preferably connected to one another by a region that is permeable to gas or merge directly into one another. The configuration being conical at least in part in the direction of the first engagement element for a second engagement element respectively causes suitably formed engagement elements of a supply block being able to be centered in a self-active manner and without additional actions by the operator, which further simplifies the assembly. The partially conical configuration can also include, for example, that a first portion of the second engagement elements is shaped to cylindrical and a second portion to be conical. The fact that the receiving region is at least in part conical (or also cone-shaped or frustoconical) is to be understood here and below to mean that the conical or cone-shaped or frustoconical configuration pertains to at least portion of the length of the engagement element or the receiving region, respectively. This implementation, however, can also extend over the entire length. Whenever an at least partially conical, cone-shaped, or frustoconical configuration (along a length)

is mentioned hereafter, the option of a completely conical, cone-shaped or frustoconical configuration of the respective element is always included.

It is provided in one embodiment that the connecting element includes fastening devices for releasably fastening the connecting element to a housing of the valve array. These fastening devices are preferably configured to be without tools, so that a fixed connection to the valve housing can be established, for example, by way of suitable click or plug connectors, but wherein this connection can preferably also be released again, for example, to realign the connecting element relative to the housing of the valve array. This also facilitates the assembly, since the worker does not need to use any tools to establish the respective connection.

In addition, the second engagement elements and/or the first engagement elements can be designed as sockets.

The supply block according to the disclosure for connecting tubes to a connecting element according to one of the preceding embodiments includes an attachment side for attaching the tubes to the supply block and a connection side for connecting the supply block to the connecting element, wherein the connection side includes engagement elements which can be made to engage with the second engagement elements of the connecting element for establishing a gas-tight connection, wherein the supply block is made of a material that is less flexible than the connecting element or includes such less flexible material.

Due to its structural rigidity, as compared to the connecting element, this supply block can easily be made to engage with the connecting element, wherein any discrepancy in the alignment of the connecting element and the supply block relative to each other is compensated for by, firstly, the flexibility of the connecting element and, secondly, the rigidity of the supply block. The connecting element of the supply block being made of less flexible material or comprising such a less flexible material is to be understood as meaning that the flexibility of the material that includes the supply block or from which it is made (for example at least the engagement elements of the supply block) is harder than the flexible material of the connecting element. The disclosure is not restricted such that the connecting element may not include any material that is harder (or less rigid) than the less flexible material of the supply block. This is instead to be understood according to the disclosure in such a way that the "less flexible material" of the supply block is at least less flexible than the "flexible material" which, according to the above embodiments, includes the connecting element or of which the latter is made.

It can also be provided that the engagement elements of the supply block are configured as connectors. With suitably designed connectors, an easy connection of the supply block to a connecting element already mounted on the valve array can be established.

It is provided in a further development of this embodiment that the engagement elements of the supply block are at least in part conical or frustoconical.

The conical and/or frustoconical configuration of the engagement elements of the supply block, with a correspondingly complementary configuration of the second engagement elements of the connecting element, cause in self-centering guidance when establishing the connection between the supply block and the connecting element, which avoids misalignments.

In addition, the attachment side can include devices for connecting the supply block to tubes, wherein the devices for connecting enable the supply block to be connected to tubes without tools. This allows the installation of the tubes on the supply block to be easy for the operator.

In one embodiment, the supply block includes fastening devices for fastening the supply block to a housing of a valve array. The fastening devices particularly preferably allow the supply block to be fastened to the housing of the valve array while the connecting element is already connected to the valve attachment block of the valve array and is positioned there. The connecting element is therefore preferably clamped between the supply block and the valve array or its valve attachment block, respectively.

According to the disclosure, a combination of a connecting element according to one of the previous embodiments and a supply block according to one of the previous embodiments is provided. This combination realizes the advantages obtained by both the connecting element as well as the supply block.

It can be provided there that the second engagement elements of the connecting element and the engagement elements of the supply block have a complementary shape. This can ensure a gas-tight seat and a reliable connection between the supply block and the connecting element.

In a further development of this embodiment, the second engagement elements of the connecting element and the engagement elements of the supply block are configured to establish a self-centering connection between the connecting element and the supply block. This makes it even easier for the worker to connect the supply block and the connecting element to one another.

According to the disclosure, a combination of a valve array comprising a valve attachment block, a connecting element according to one of the previous embodiments, and a supply block according to one of the previous embodiments is furthermore provided. The combination of the valve array, the connecting element, and the supply block thus constructed is easier to produce, while a reliable, in particular gas-tight connection, can nevertheless be established.

It can be provided that the valve attachment block includes ports that are conical or frustoconical at least in part and wherein the engagement elements of the supply block have a conical or frustoconical shape at least in part and wherein the first engagement elements and the second engagement elements of the connecting element are configured to be sockets that are conical or frustoconical at least in part. These connections are substantially self-centering, making assembly easier for the operator.

BRIEF DESCRIPTION OF THE DRAWINGS

FIG. 3b is a top view showing the supply block of FIG. 3a.

DETAILED DESCRIPTION

Figure 1:
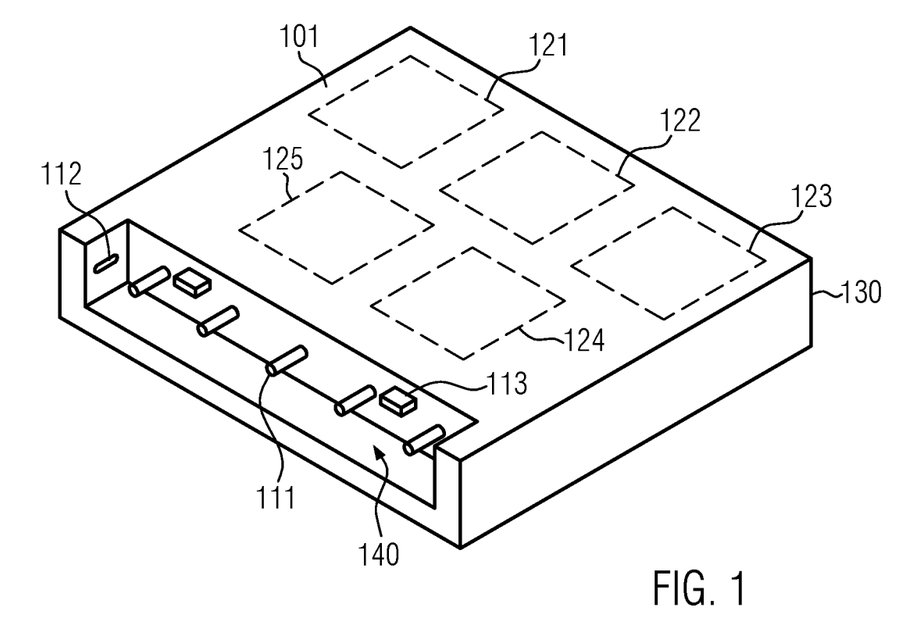
FIG. 1 is an isometric view showing a housing of a valve array according to one embodiment with a valve attachment block.

FIG. 1 shows a valve array 101 according to one embodiment of the disclosure. This valve array includes a housing 130 in which a plurality of valves 121-125 can be arranged, presently shown only schematically, and can be actuated in particular separately in order, for example, to supply air (or another gas) to an air cushion or bladder connected to them in a vehicle seat or to drain it from the air cushion or bladder. For this purpose, valves 121-125 are typically isolated from one another and can also be actuated separately by a suitable control unit so that no unintentional exchange of air takes place, in particular in the region of the valve array, so that applying or draining air from one of the air cushions connected to the valve array according to the disclosure has no effect on the quantity of air in the other air cushions.

While the following description always speaks of "air cushions" and filling or draining air, it is understood that such bladders or air cushions could also be acted upon with other gases. However, it is advisable to use the air that is available for this purpose anyway. The term air cushion is also to be understood to mean all other versions of hollow bodies that can change shape by filling or draining air so that there shall presently be no further distinction made between air cushions and bladders. The air cushions are also not restricted in terms of their external shape.

The air cushions are typically integrated into a vehicle seat and distributed over the backrest. The valve array according to the disclosure, however, is arranged at exactly one location and away from the air cushions, which can make it difficult to connect the valve assembly to the air cushions or to connect the valve assembly to an air source when the seat is already preassembled.

Housing 130, in which individual valves 121-125 are arranged, is not restricted in terms of the number of valves and their arrangement. Likewise, one or more outlets can be provided on any side of the housing and can be connected to tubes, for example, for introducing or draining air by way of individual valves 121-125.

In addition, control electronics can be provided within housing 130 and can effect an actuation of the individual valves, for example, by operating actuators, as are known from prior art.

It is essential that valve array 101 includes in region 140 a valve attachment block which includes a series of ports 111 via which air can be supplied via or to valves 121-125 provided in the valve array.

The number of ports can in particular correspond to the number of valves 121-125, wherein each port can be connected, for example via an internal line, to the valve that it is associated with, and only thereto. In the embodiment shown in FIG. 1, for example, five valves 121-125 are provided so that in this embodiment five individual ports 111 can be provided in valve attachment block 140.

The individual ports can basically have any shape. As can be seen in the following embodiments, however, a conical (frustoconical) shape is particularly preferred in which the diameter of the free side of the port shown in FIG. 1 (which is not connected to housing 130 and points away therefrom, respectively) has a smaller diameter than the opposite end of the port. A connection that is easy to center is created in this way in interaction with the connecting element to be described later in FIG. 2. The conical shape does not need to extend over the entire length of the ports. A first portion of the length of the ports can be shaped to be cylindrical and a second portion extending towards the free end can be shaped to be conical.

While the basic components of the valve assembly are known from prior art, further elements are provided, in particular with regard to the disclosure. For example, housing 130 and there in particular the valve attachment block can include devices, that are complementary to fastening devices of the connecting element still to be described in FIG. 2, for establishing a releasable connection or fastening of the connecting element to housing 130 of the valve array. These devices are identified as devices 112 and can include, for example, click connectors or the like. Embodiments are there particularly preferred which enable (self-centering) fastening of the connecting element to housing 130 without the use of tools. As already described, this can be achieved by way of click connections, plug connections or the like.

Furthermore, devices complementary to the fastening devices provided for the supply block can be provided in a supply block to be described later and enable a (preferably releasable) connection of the supply block to housing 130 of the valve array. These devices are presently shown schematically as devices 113. They can be configured in analogy or similar to devices 112 and allow in particular establishing a connection without tools between the supply block and housing 130 and in particular between valve attachment block 140 of the valve array.

Figure 2A:
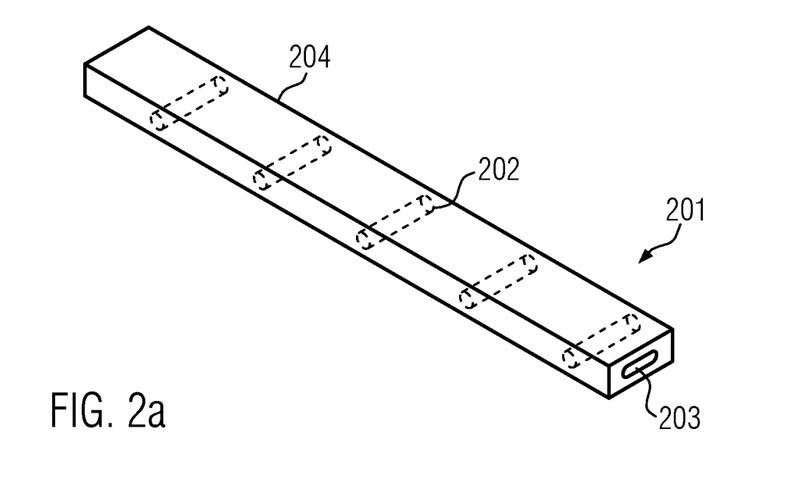
FIG. 2a is an isometric view showing a connecting element according to one embodiment of the disclosure.
Figure 2B:
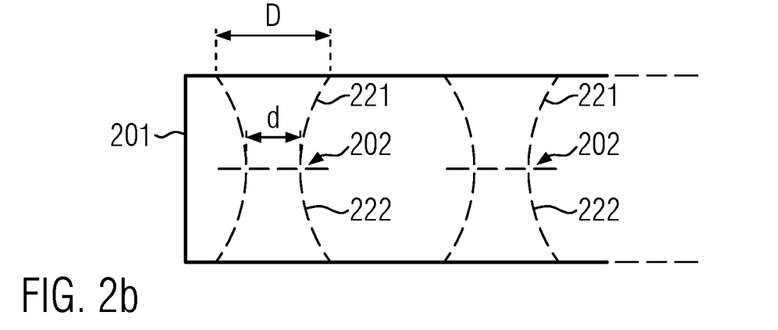
FIGS. 2b and 2c are partial top views showing connecting elements according to alternative embodiments of the disclosure.
Figure 2C:
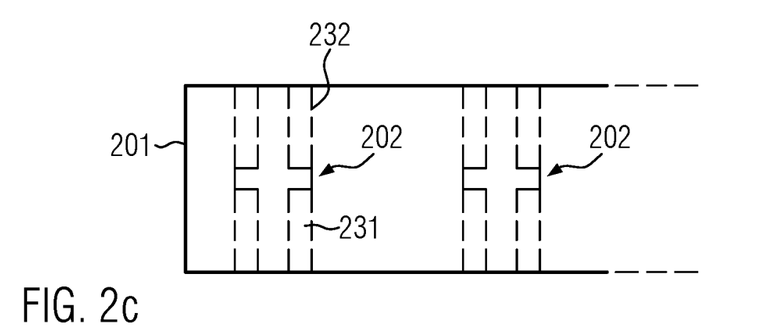

FIGS. 2a-2c show embodiments of a connecting element which can be used in particular in combination with the valve array described in FIG. 1 and the supply block to be described later for establishing, firstly, a gas-tight and, secondly, an easy-to-assemble connection between tubes, or similar elements carrying gas, and valve attachment block 140, and there in particular ports 111 of the valve array.

For this purpose, connecting element 201 includes a connecting element body 204 through which a series of passage openings 202 run. These passage openings preferably extend end-to-end through body 204 so that respective openings are formed on one side and on the oppositely disposed side of the body. The openings disposed on one side and also a part of the portion of the passage openings extending within the body shall be referred to as "first engagement elements" and the regions of passage openings 202 disposed on the opposite side of body 204 shall be referred to as "second engagement elements".

The first engagement elements are there provided and configured in such a way that they can enter into a connection with ports 111 of valve attachment block 140 of the valve array from FIG. 1.

The second engagement elements are configured such that they can enter into a connection with the supply block according to the embodiments described for FIG. 3.

As shall be explained later in the following, the supply block likewise includes engagement elements which can be shaped in particular like ports 111, i.e., also in particular (at least in part, for example in part only along the length of the ports) to be conical and/or frustoconical.

The first engagement elements and the second engagement elements in the connecting element are preferably configured as sockets with which correspondingly shaped connectors (ports 111 of the valve array for the first engagement elements and the engagement elements of the supply block into the second engagement elements) can engage.

However, it is also conceivable that the respective parts of the supply block and of the valve array are configured as sockets and the first and/or second engagement elements are shaped as connectors in the connecting element. The disclosure is not restrictive in this regard, so that connectors can also be formed on one side of the connecting element and sockets can be formed on the other side.

Fastening devices 203 can be provided for establishing a preferably releasable connection, and that is particularly preferably releasable without tools, of the connecting element to housing 130 of the valve array and there in particular to valve attachment block 140, and can be made to engage with complementary devices 112 which are preferably provided in valve attachment block 140 or as part thereof in the housing of the valve array. They can be suitable handle connectors and/or plug connectors and/or push buttons or the like, so that fastening the connecting element can preferably be possible without tools.

According to the disclosure, the connecting element is made of flexible material or includes such material at least in part. This means that at least part of connecting element 201 is produced from flexible material. Flexible materials are there understood as being such materials whose shape can be changed by the action of force, wherein the flexible material returns to its original shape at least in a certain magnitude range of a force when the action of force is cancelled. Polyurethane, rubber and in particular elastomers are considered to be flexible materials.

The entire connecting element can be made of such flexible material, which in particular can simplify the manufacture of the connecting element. However, it can also be provided that only parts of the connecting element are made of such flexible material.

It is provided in particular that the connecting element is configured such that a gas-tight connection between the first engagement elements and the valve attachment block on the one hand and the second engagement elements and the engagement elements of the supply block on the other hand can be ensured.

FIG. 2b shows a possible embodiment in this regard. Connecting element 201 is shown there in a schematic top view, wherein the region of the openings 202 is shown in dashed lines.

Openings 202 there are configured in such a way that first engagement element 221 is shown in the upper part of FIG. 2b and second engagement element 222 is shown in the lower part. In this embodiment, the engagement elements are configured as sockets which, as already described above, is not necessarily the case.

In principle, the shape of the first and second engagement elements is arbitrary and does not have to be identical. It is also conceivable that the engagement elements have different shapes. A first number of engagement elements can have a first shape and a second number of engagement elements can have a second shape that differs from the first shape. The disclosure is not restricted in terms of the number of different shapes of engagement elements.

In a preferred embodiment according to FIG. 2b, the first engagement elements and/or the second engagement elements are configured as sockets which have a conical (frustoconical) shape such that the diameter of the opening on the outer wall of the connecting element (denoted by D) is greater than the diameter d of the opening within the connecting element. The conical shape does not need to extend over the entire depth of the opening. A first portion of the depth of the opening can be shaped to be cylindrical and a second portion towards the surroundings can be shaped to be conical. The opposite arrangement or any other configuration is also conceivable there. These conical or in part conical regions can also be understood as being receiving regions, since they can receive the corresponding elements of the valve attachment block and the supply block.

It is indeed provided that first engagement element 221 and second engagement element 222 are created as part of an end-to-end opening in the connecting element. However, it need not be provided there that their smaller diameters d be the same. The first engagement element of an opening 202 can therefore also have a diameter d1 which is smaller or larger than diameter d2 of second engagement element 222 of this opening 202. The same applies to the large diameters D.

The conical (frustoconical) shape of the first and/or second engagement elements, especially when they are configured as a socket, is particularly preferred because they have a self-centering effect in combination with ports and/or engagement elements of the supply block which are also conical (frustoconical), which simplifies assembly.

FIG. 2c shows a further embodiment in which the openings in the embodiment shown there pass only as cylindrical bores through connecting element 201. This is not restrictive. Other shapes of these sockets than presently described can also be used in this embodiment. In this embodiment, openings 202 include on their inner surface one or more flexible components 231, 232 made of flexible material. They can be configured, for example, in the shape of a ring or cylinder jacket running around the inner surface of the opening. If only these elements 231, 232 are made of elastic material within opening 202, then they can particularly preferably be adapted to the external shape and/or the alignment of ports of the valve attachment block on the one hand and/or to engagement elements of the supply block (see FIGS. 3a and 3b) on the other hand, which despite the non-self-centering effect as compared to FIG. 2b enables a gas-tight and easy-to-establish connection of the valve array to the necessary tubes by way of the connecting element and the supply block.

While elements 231 and 232 are shown there as being separate from one another within an opening 202, it is also conceivable that entire opening 202 has a coating made of the flexible material that entirely or substantially entirely (at least 60% or 70% or 80%) covers its inner surface.

Figure 3A:
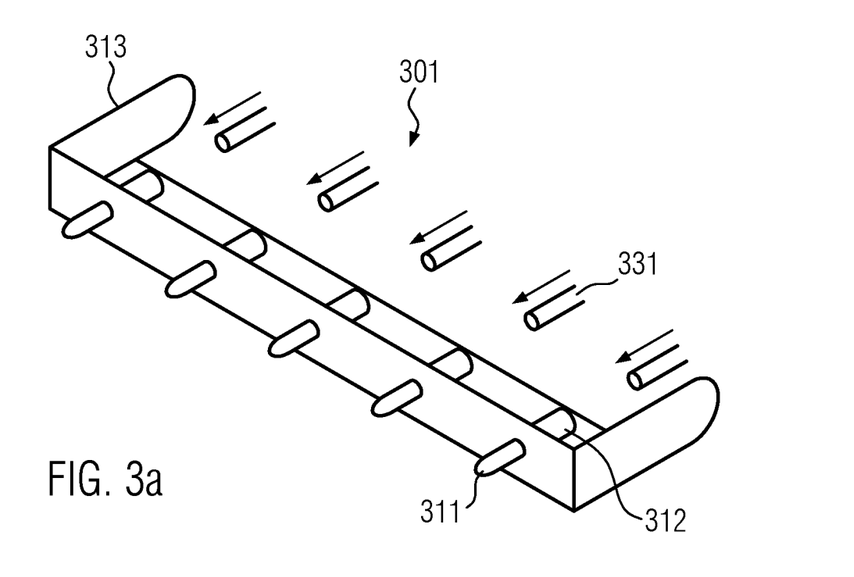
FIG. 3a is an isometric view showing a supply block according to one embodiment of the disclosure.
Figure 3B:
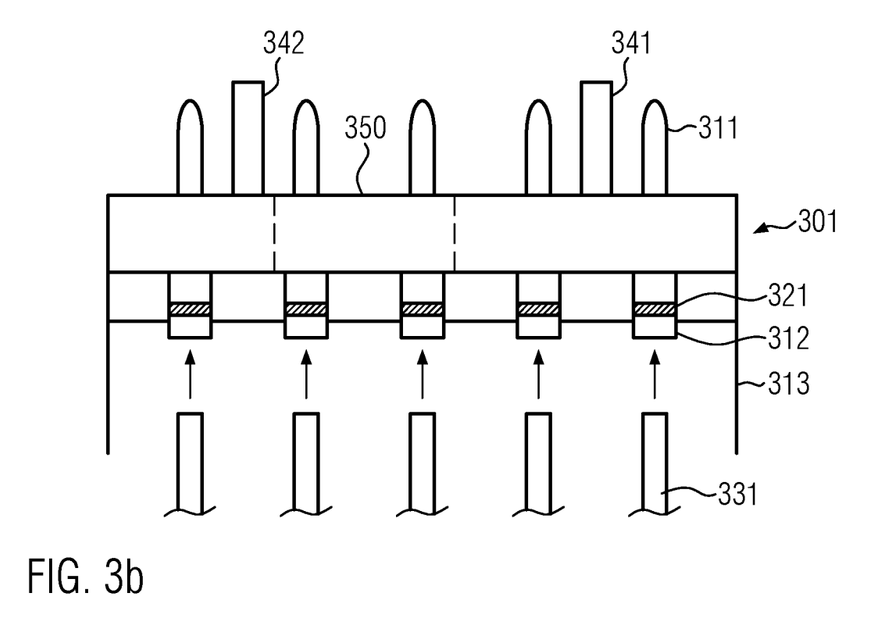

FIGS. 3a and 3b show different views of a supply block 301 according to one embodiment.

Supply block 301 includes, firstly, an attachment side which includes individual ports 312 and to which tubes 331 for supplying a gaseous medium (in particular air) can be attached. It goes without saying that "supplying" (and, synonymously, discharging) means either supplying/discharging air to/from the air cushions connected to the valve array (the supply block therefore establishes a connection between the valve array and the air cushions) or that (alternatively or additionally) supply block 301 establishes a connection between the valve array and a source or discharge device for supplying or discharging air to/from the valve array. The disclosure is not restricted in this regard. For the sake of simplicity, only the case is described below in which the valve array is supplied with air via the supply block in that the former is connected to a respective source. Transferring this to the other embodiments, in particular for supplying and discharging air to/from air cushions by way of the valve array by connecting the valve array to the air cushions with the aid of the supply block, can be implied therefrom.

On the opposite side, the supply block includes a connection side which includes a series of engagement elements 311 which can be made to engage with the second engagement elements of the connecting element (see in particular above for FIGS. 2a to 2c) for establishing a gas-tight connection. It can be provided in particular that, if the second engagement element or the second engagement elements, respectively, of the connecting element (see above) are configured as sockets, then engagement elements 311 of supply block 301 are configured as corresponding connectors, preferably having a complementary shape. If the second engagement elements of the connecting element are, for example, are formed to be (in part) conical or cone-shaped or frustoconical having an opening diameter in the outer surface of the connecting element that is larger than the inner diameter of second engagement element 222, then engagement elements 311 of the supply block can also be formed (at least in part) to be conical or frustoconical in such a way that the ends of the engagement elements facing away from the supply block have a smaller diameter than the parts of the engagement elements of the supply block directly connected to the supply block. In particular, a self-centering connection can be established therewith between the connecting element and the supply block.

Openings can run between connections 312 and engagement elements 311 between the attachment side and the connection side in order to transport the gas introduced through tubes 331 through the supply block and to discharge it from the engagement elements.

FIG. 3b shows a top view of a supply block 301 according to one embodiment.

In the embodiment presently shown, ports 312 and therefore also the attachment side of the supply block include devices 321 for connecting the supply block to tubes 331. These devices allow the tubes to be connected to the supply block preferably without tools, which can be realized in particular by way of clamps or rotatable elements with a variable inner diameter. It can be provided in particular that the inner diameter of ports 312 is generally larger than the outer diameter of tubes 331 so that the tubes can be inserted into ports 312 and can then be affixed by devices 321 (preferably in the form of a gas-tight connection) within the ports. Suitable clamps can there be employed. An opposite embodiment is also conceivable in which tubes 331 have an inner diameter that is larger than the outer diameter of ports 312. Here as well, clamps or similar elements can be employed to establish a gas-tight connection between the tubes and ports 312 on the other hand.

Furthermore, supply block 301 in the embodiment presently shown includes fastening devices 341 and 342 which are preferably configured such that they can enter into a connection with housing 130 of a valve array, as shown for example in FIG. 1, so that the supply block can be connected to the housing of the valve array. In particular, fastening devices 341 and 342 can be made to engage with complementary devices 113, as they were described in FIG. 1 as part of the housing and in particular as part of the valve block.

This preferably happens without tools, so that the connection between fastening devices 341 and 342 to complementary devices 113 is easy for a worker to establish and, if necessary, to released again.

Elements 313 are additionally shown in FIGS. 3a and 3b. They can be understood as being guide elements or as a frame of the supply block and can enable the supply block to be introduced more easily into the valve attachment block or a corresponding region of the valve array. Unintentional canting is then avoided. In addition, elements 313 can also serve to establish a connection to a connecting element and/or the housing of the valve array, for example, in the sense of fastening devices 341 and 342, which can also be part of elements 313.

While the supply block is presently shown as being formed "integrally", the dashed illustration of region 350 in FIG. 3b shows that supply block 301 can also be formed from segments 350 that are independent of one another but can be connected to one another, wherein each of these segments can include one or more engagement elements and an attachment side for attaching the tubes to this segment. Corresponding slots with which individual segments 350 can be attached can then be provided in a base body of the supply block.

It is provided according to the disclosure that the supply block or at least engagement elements 311 of supply block 301 are made of or include at least less flexible material than the flexible material that forms part of connecting element 201. This ensures that sufficient pressure can be exerted to establish a gas-tight connection in interaction with the material of the connecting element when the connection is established between the connecting element and the supply block.

Figure 4:
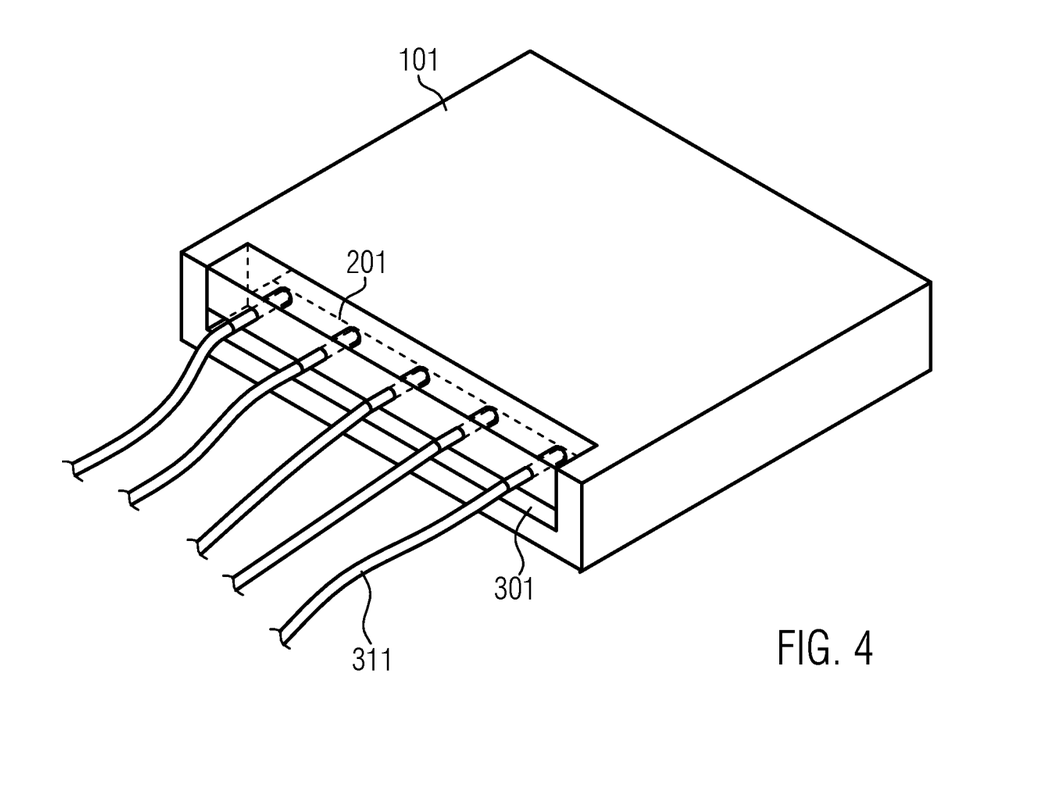
FIG. 4 is an isometric view showing a combination of a valve array, a connecting element, and a supply block with fastening devices for fastening the supply block to the housing of the valve array.

FIG. 4 shows an embodiment in which valve array 301 is connected to a supply block 301 according to one of the preceding embodiments. It can be provided in particular that connecting element 201, which establishes the connection between the engagement elements of the supply block on the one hand and the ports of the valve attachment block of the valve array on the other hand with the aid of its first and second engagement elements, is enclosed between supply block 301 and the housing of the valve array, in particular the valve attachment block, in the assembled state of the valve assembly, of the connecting element and of the supply block.

Since the supply block can enter into a (releasable) connection to the housing of the valve array according to the embodiment described in FIG. 3b, the connecting element is held reliably in this embodiment and unintentional release of the connecting element and/or the supply block can be prevented. In addition, it can be ensured in this way that the connections established are and remain gas-tight, respectively.

In the embodiment previously described, it was provided that the connecting element includes as many engagement elements as there are port in the valve attachment block of the valve array. Accordingly, it is provided in a preferred embodiment that the connecting element also includes as many second engagement elements as the supply block includes engagement elements. The number of engagement elements of the supply block is particularly preferably equal to the number of ports of the valve attachment block of the valve array.

However, in particular if the supply block includes one or more segments 350 according to the embodiment described in FIG. 3b, it can also be provided that the connecting element is likewise not configured as a single component, but is formed to include several components that are suitably connectable to one another in that, for example, they are plugged together to form a (larger) connecting element. This allows for variable adaptation to different valve attachment blocks and/or supply blocks, where, for example, it is also possible to respond to different shapes of the ports of the valve attachment block and/or the engagement elements of the supply block.

The invention claimed is:

1. A combination comprising:
   a connecting element for connecting ports of a valve attachment block of a valve array to a supply block, the connecting element including:
   first engagement elements on one side of the connecting element for establishing a connection to the ports of the valve attachment block; and
   second engagement elements on another side of the connecting element for establishing a connection to the supply block;
   wherein the first engagement elements and the second engagement elements are configured to establish a gas-tight connection to the valve attachment block and to the supply block; and wherein the connecting element includes a flexible material; and the supply block including an attachment side for attaching tubes to the supply block and a connection side for connecting the supply block to the connecting element;

wherein the connection side includes engagement elements which are engageable with the second engagement elements of the connecting element for establishing a gas-tight connection; and wherein the supply block includes a material that is less flexible than the flexible material of the connecting element; and wherein the ports are configured as one of conical or frustoconical, the engagement elements of the supply block are configured as one of conical or frustoconical, and the first engagement elements and the second engagement elements include sockets, the sockets configured as one of conical or frustoconical.

2. The combination according to claim 1, wherein the second engagement elements of the connecting element and the engagement elements of the supply block have complementary shapes.

3. The combination according to claim 2, wherein the second engagement elements of the connecting element and the engagement elements of the supply block are configured to establish a self-centering connection between the connecting element and the supply block.

4. A combination comprising:

a valve array having a valve attachment block, the valve attachment block defining ports therein;

a connecting element for connecting the ports to a supply block, the connecting element including:

first engagement elements on one side of the connecting element for establishing a connection to the ports of the valve attachment block; and second engagement elements on another side of the connecting element for establishing a connection to the supply block;

wherein the first engagement elements and the second engagement elements are configured to establish a gas-tight connection to the valve attachment block and to the supply block; and wherein the connecting element includes a flexible material; and the supply block including an attachment side for attaching tubes to the supply block and a connection side for connecting the supply block to the connecting element;

wherein the connection side includes engagement elements which are engageable with the second engagement elements of the connecting element for establishing a gas-tight connection; and wherein the supply block includes a material that is less flexible than the flexible material of the connecting element; and wherein the ports are configured as one of conical or frustoconical, the engagement elements of the supply block are configured as one of conical or frustoconical, and the first engagement elements and the second engagement elements include sockets, the sockets configured as one of conical or frustoconical.

* * * * *